(No Model.)

R. B. WHITZEL.
ROLLER FOR SKATES.

No. 338,576. Patented Mar. 23, 1886.

Witnesses.
Robert Everett,
Geo. W. Rea.

Inventor.
Russell B. Whitzel.
By James L. Norris.
Atty.

UNITED STATES PATENT OFFICE.

RUSSEL B. WHITZEL, OF COLUMBUS, OHIO.

ROLLER FOR SKATES.

SPECIFICATION forming part of Letters Patent No. 338,576, dated March 23, 1886.

Application filed July 28, 1885. Serial No. 172,879. (No model.)

*To all whom it may concern:*

Be it known that I, RUSSEL B. WHITZEL, a citizen of the United States, residing at Columbus, in the county of Franklin and State of Ohio, have invented new and useful Improvements in Rollers for Skates and other Uses, of which the following is a specification.

My invention relates to rollers for skates and other uses, and has for its object to construct a wheel which shall be simple and strong, noiseless, and elastic, and not liable to cut or mark the floors, and at the same time will permit its several parts to be easily adjusted at the time that they are put together, so as to tighten the tire or metallic band that constitutes the periphery.

To the accomplishment of the above ends the invention consists in the construction and the combination of parts, hereinafter particularly described, and then specified by the claims.

Figure 1:
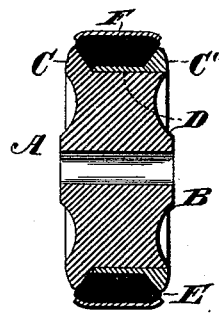
Figure 2:
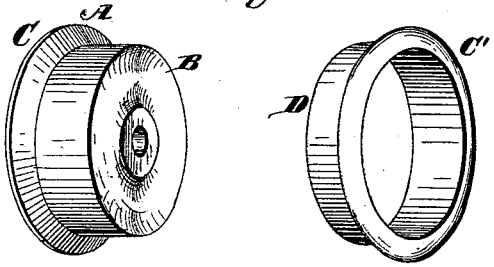
Figure 3:
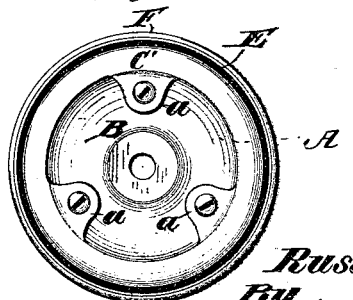

Figure 1 of the drawings is a section through the wheel. Fig. 2 is a perspective showing the two flanged portions of the wheel separated. Fig. 3 is a side view of a modification of the beveled adjusting-ring.

In the drawings, the letter A designates the main portion of the wheel, composed of the hub B and flange C at one edge, the said flange being beveled from the brim ordinarily. The other section of the wheel consists of the ring D, having at one edge a flange, C', beveled from the face of the ring outwardly. This ring is adapted to fit over the hub B and be secured thereto by glue or other suitable adhesive substance, if made of wood or other material possessing strength and capable of being secured by such means, or by screws or rivets if made of metal, in which latter event it will be formed with ears a for the passage of screws entering the hub, or rivets passing through to the other side with their ends upset. Around the hub and ring is placed a rubber packing, E, made in one piece or in sections, with its lower face beveled at both edges, to conform to the beveled flanges. This packing or cushion is held in place by a metallic rim or tire, F, which fits around the same, covering the whole face of the packing next to the band, and having its edges rounded preferably by slightly bending them, so as to lap over the edges of the packing, thus serving not only to cover the edges to keep them from being forced beyond the edges of the tire, but also forming round or blunt edges to the roller, so that the floor will not be marked or cut by the edges of the tire or band.

In putting the parts together, the ring is slipped over the hub, the rubber packing or cushion is applied thereto, the metal tire put over the packing, and then the ring pushed farther onto the hub, either by the fastening-screws or by the band, or other means when other means for fastening are used. As the ring is passed inwardly, the rubber is compressed between the beveled flanges and the faces of the ring and tire or band, so that it is forced evenly outward to fill up all space between the parts, and thus firmly and securely bind the tire or band to the roller. By the ring fitting under the rubber and pressing upward while the beveled flanges press inwardly and upwardly, the packing is evenly compressed and better results obtained. If desired, the flange C' might be used without the ring D, since it is annular and fits and moves upon the hub; but I prefer to use the ring with it.

By the construction described I get a very simple and strong roller, adapted to various uses, and one which is noiseless, so far as the same can be, and one that is not liable to cut or damage the floor. The solid hub not only gives firmness to the roller, but also prevents any oil, if such be used as a lubricant, from working its way through the hub to the periphery of the roller.

Having described my invention, and set forth its merits, what I claim is—

1. The combination, with a roller having a recessed periphery with beveled walls, of a beveled packing fitting in said recess, and a tire or band covering the entire peripheral face of said packing, said tire having its annular edges rounded and bent around the edges of the packing to cover and protect said edges and prevent injury to the surface traversed, substantially as described.

2. A roller composed of a hub having a beveled flange at one edge, a beveled annulus fitting around said hub, an elastic packing or cushion fitting in the beveled recess formed by said parts, and a tire or band fitting around the rubber packing, substantially as described.

3. A roller composed of a hub having a beveled flange at one edge, a ring fitting around said hub and formed with a beveled flange, an elastic packing fitting between said flanges, and a tire or band fitting around the packing, substantially as described.

In testimony whereof I affix my signature in presence of two witnesses.

RUSSEL B. WHITZEL.

Witnesses:
E. B. YARNELL,
E. C. BRIGGS.